J. T. LISTER.
METHOD OF FORMING TIRE FABRIC AND TIRES.
APPLICATION FILED DEC. 1, 1916.
1,274,910.
Patented Aug. 6, 1918.
4 SHEETS—SHEET 3.
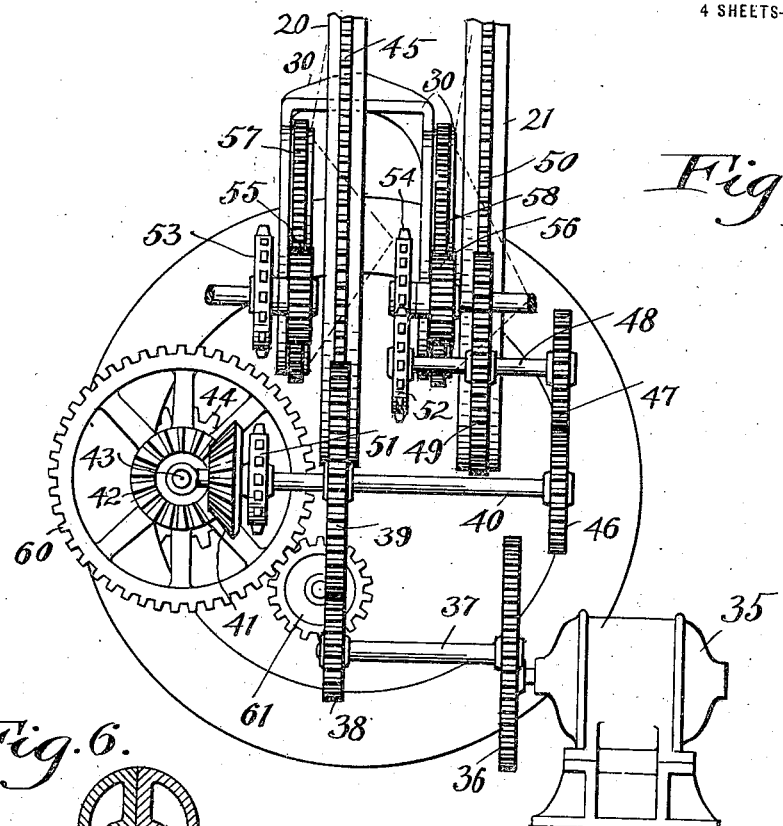
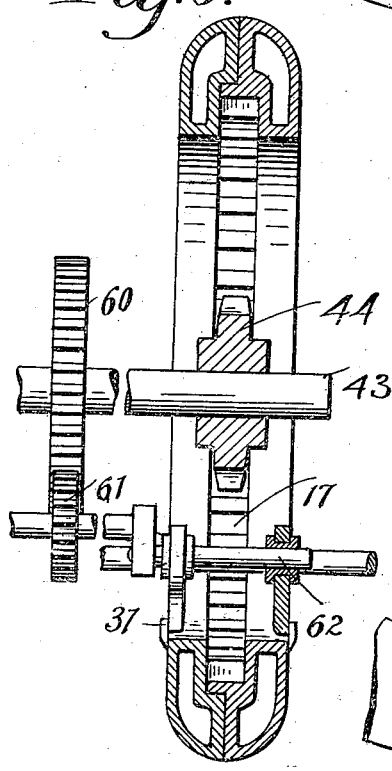
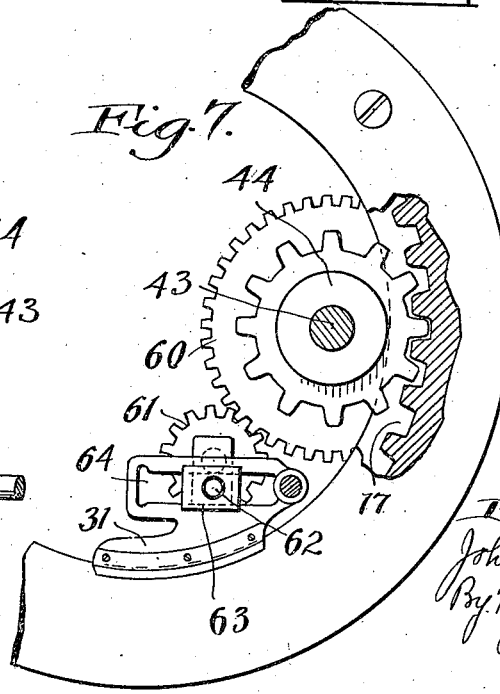
Inventor
John T. Lister
By Thurston & Thurston
attys.

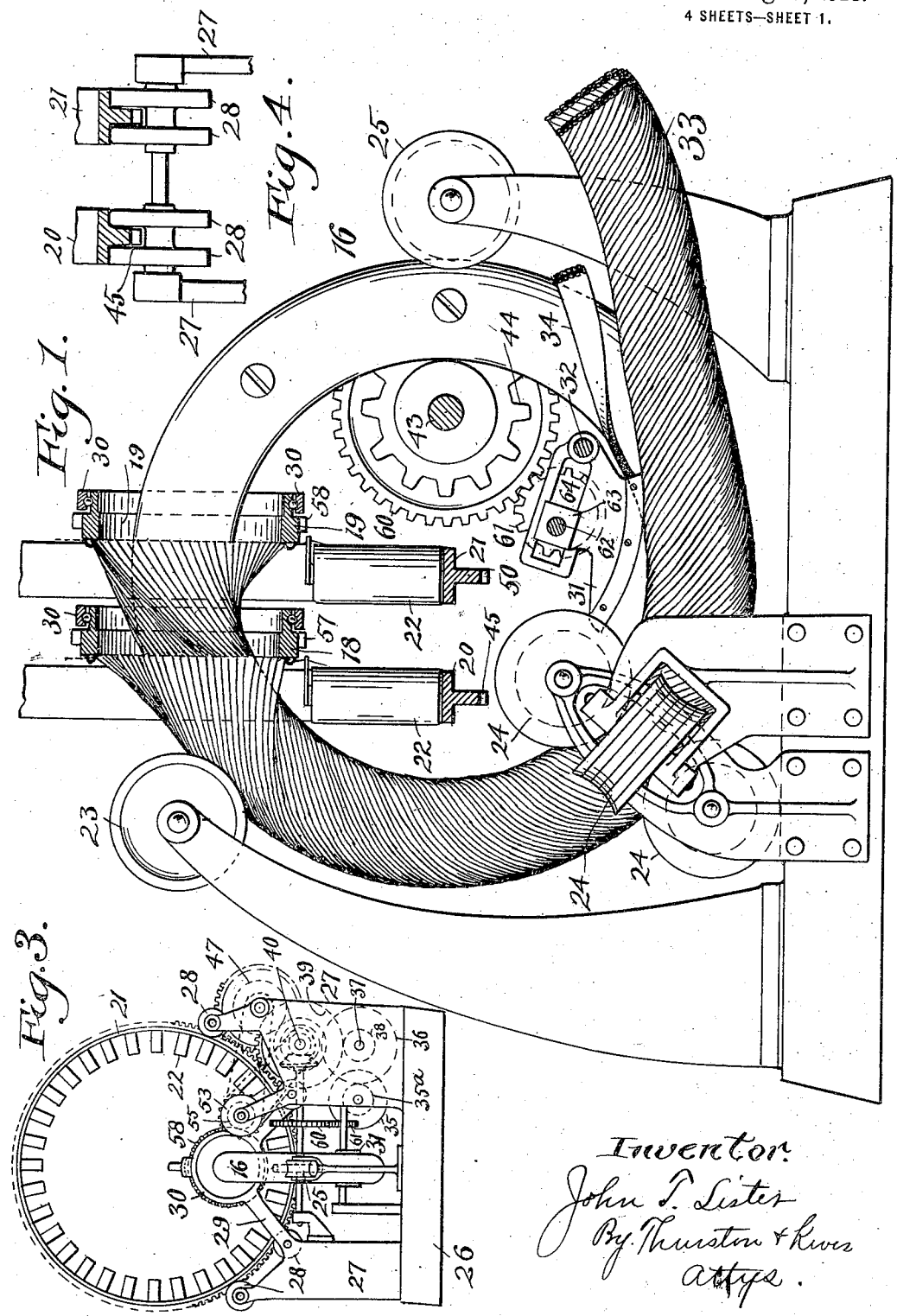

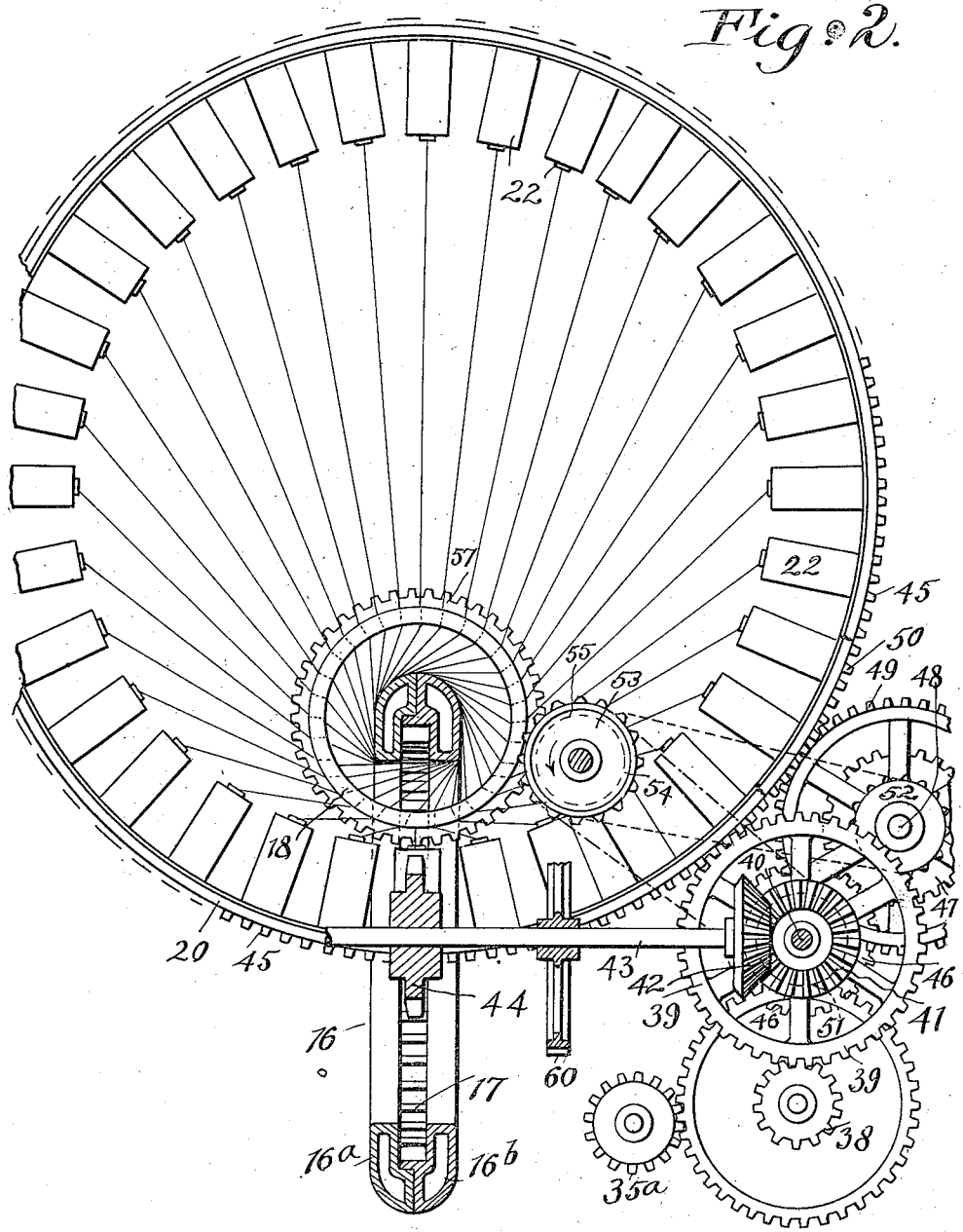

J. T. LISTER.
METHOD OF FORMING TIRE FABRIC AND TIRES.
APPLICATION FILED DEC. 1, 1916.
1,274,910.
Patented Aug. 6, 1918.
4 SHEETS—SHEET 4.
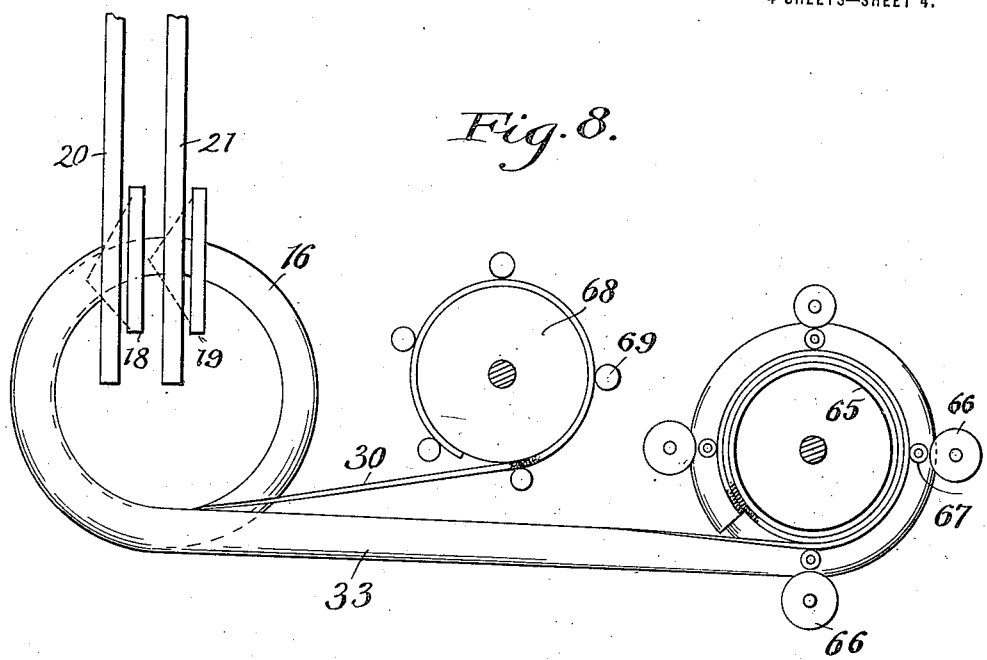

UNITED STATES PATENT OFFICE.

JOHN T. LISTER, OF CLEVELAND, OHIO.

METHOD OF FORMING TIRE FABRIC AND TIRES.

1,274,910.

Specification of Letters Patent.

Patented Aug. 6, 1918.

Application filed December 1, 1916. Serial No. 134,232.

*To all whom it may concern:*

Be it known that I, JOHN T. LISTER, a citizen of the United States, residing at Cleveland, in the county of Cuyahoga and State of Ohio, have invented a certain new and useful Improvement in Methods of Forming Tire Fabric and Tires, of which the following is a full, clear, and exact description.

This invention relates to method of forming tire fabric and tires, and has particular reference to the making of a semi-solid tire and fabric therefor similar to the tire constituting the subject matter of my prior application Serial No. 121,541, filed September 22, 1916.

The invention may be briefly summarized as consisting in certain novel steps of the method and certain novel combinations and arrangements of parts and details of construction which will be described in the specification and set forth in the appended claims.

In the accompanying sheets of drawings, wherein I have shown one embodiment of the invention, Figure 1 is a view partly in side elevation and partly in section of a portion of the apparatus which is utilized in forming the fabric; Fig. 2 is another side view with parts in section showing the same apparatus, the apparatus being shown as viewed from the left hand end of Fig. 1; Fig. 3 is a similar view on a much reduced scale showing the supporting means for the spool holder and winders; Fig. 4 is a detail view showing supports for the spool holder; Fig. 5 is a side view of the apparatus viewed from the position of Fig. 1 but showing the driving mechanism which has been omitted from Fig. 1; Fig. 6 is a sectional view through the fabric forming core showing particularly the shape, construction and manner of driving the core, and also showing in detail the cutter; Fig. 7 is a side view with parts broken away of what is illustrated in Fig. 6; Fig. 8 is a conventional view showing the manner in which a fabric formed on the fabric forming core is led from that core and fed onto rotary formers on which the tire is substantially formed; Fig. 9 is an enlarged view with parts in section showing the manner in which the body part of the tire is formed on the tire forming core; and Fig. 10 is a perspective view of a portion of the completed tire formed in accordance with my invention.

Before describing the fabric and tire forming method constituting the subject matter of this application I will first briefly describe the tire in the manufacture of which this method has particular utility, and which is illustrated in Fig. 10. This tire 15 which is more fully illustrated and described in my prior application previously referred to, and which is a semi-solid tire to be used without an inner tube, consists of a closed hollow air-tight body substantially U-shaped in cross-section and provided with an outer rounded portion $15^a$, straight parallel sides $15^b$ continuous therewith, and an inner flat piece $15^c$ which is set between and vulcanized to the inner portions of the straight sides $15^b$. Opposite the inner piece $15^c$ the edges of the side portions thereof are bent or molded outwardly to form beads $15^d$, and onto the outer tread portion of the body of the tire is preferably vulcanized a separate tread portion $15^e$. This tire is formed principally of rubberized cords or equivalent tire forming material arranged in superposed layers, and the U-shaped body, the inner flat rim piece $15^c$, and beads $15^d$ are not only formed of the same materials, that is to say, superposed layers of cord, but are formed from the same continuous piece of fabric, which by the method and apparatus of this application is formed as a closed tube on a fabric forming core, and is then cut lengthwise in such a way as to form the parts or strips from which the body of the tire and the rim portion $15^c$ are made. These strips or parts of the tube are conducted from the fabric forming core to separate cores onto which they are properly shaped and prepared so that the body portion formed on one core, and the rim portion $15^c$ formed on another core can be assembled and placed in a vulcanizing mold to form the closed semi-solid tire previously described.

Considering now the method which forms the subject matter of this application, it will be seen that I utilize an annular rotary fabric forming core 16, the cross-sectional shape of which is substantially that of the tire 15, that is to say it has a curved or rounded outer peripheral portion, straight sides and an inner periphery which is flat except for a groove or recess in which is formed or fixed the driving gear teeth 17. This core in cross-section is not only shaped substantially like the tire, but in cross-section it is substantially the same in size as the inner closed space of the tire 15. In diameter, however, it is somewhat larger than the diameter of the tire in order that it will be sufficiently large to accommodate certain winders, spool holders, cutters and driving gears to be explained. In other words, the fabric which is formed on this core will have a substantial tendency to conform to the shape of the core on which the body part of the tire is formed. This core 16 is preferably formed in two halves or sections 16$^a$ and 16$^b$ suitably bolted together.

There is formed on this core from rubberized cords, tire forming fabric, the fabric being preferably formed in two superposed layers with the cords of one layer at an angle of substantially 90° to the cords of the other layer. The fabric is formed at the top or upper portion of the core by rotating this core on its axis, and by rotating about the upper part of the core in opposite directions, two annular winders 18 and 19 which surround the upper part of the core and are provided with eyes or openings through which pass a large number of rubberized cords which are fed or supplied from a pair of spool holders 20 and 21 having the proper number of spools 22 of the previously rubberized cords. These spool holders encircle the upper part of the core 16 close to the rotary winders and are driven at the same speed as the latter, the spool holder 20 rotating at the same speed as, and in the same direction as the winder 18, and the spool holder 21 rotating in the same direction and at the same speed as the winder 19. The spool holders, winders and core are rotated at just the proper speed that a two-layer cord fabric is formed on and at the upper part of the core 16 as illustrated in Fig. 1. It will be understood that the inclination of the cords of one layer with respect to the other will depend upon the size and number of cords, the cords of each layer being laid side by side and extending spirally around the core. In this case I have shown the spool holders considerably larger in diameter than the winders because for the sake of clearness I have illustrated the spools arranged in the same annular plane. However, by staggering the spools or arranging them in two or more rows, the diameter of each spool holder could be considerably decreased over that here shown. As the cords are laid on the core in the two superposed layers they are compressed and rolled into shape by a roller 23 and by a series of rollers 24 located circumferentially a short distance around the core and away from the winding point. The rollers 23 and 24 and an additional roller 25 which engages the core a suitable distance from the rollers 24, serve to support and hold in upright position the core 16.

The winders and spool holders may be supported in proper position with reference to the core 16 in many different ways, but in this case the bed 26 of the machine (see particularly Fig. 3) is provided with standards 27 having rollers 28 which engage the periphery of the spool holders and these same standards are provided with inwardly projecting arms 29 with annular bearing rings 30 in which the winders are supported, ball bearings being preferably inserted between the bearing rings and the winders. In Fig. 1 I have shown the bearing rings 30 with the ball bearings interposed between these rings and laterally projecting flanges on the winders, and in Fig. 4 I have shown the manner in which the rollers 28 support and engage the spool holders.

At a point located substantially 180° from the winding point there are two oscillating cutters 31 which are just far enough apart to engage the opposite flat faces of the core so as to cut from the closed two-layer fabric tube which is formed on the core, the inner flat periphery, thus enabling the fabric to be removed from the core. These cutters 31 which act as shear blades are mounted on a shaft 32 and are oscillated in a manner to be subsequently described. By these cutters the tube is cut into two pieces which will be designated 33 and 34 (see particularly Fig. 1). These strips or pieces 33 and 34 may be led or fed directly onto reels which will temporarily hold them before they are formed into tires, but preferably they are led directly to the tire forming cores, the strip 33 which forms the body of the tire being led to one core or form and the strip 34 which is utilized to form the inner tread portion 15$^c$ of the tire being led to another core or form as will be described.

I will next describe the trains of gears and other power transmitting devices by which the core, winders, spool holders and shears are driven or operated, but while the mechanism to be described may be employed advantageously, I do not wish to be confined to the same, as doubtless other ways of accomplishing the results can be employed. In this case all the parts are operated from a source of power in the form of a motor 35 which may be an electric motor and drives a gear 35ª (Fig. 2) which drives a gear 36 mounted on a shaft 37 (see Fig. 5) having a gear 38 which drives a somewhat larger gear 39 which is secured to a shaft 40 provided at one end with bevel gear 41 which meshes with a second bevel gear 42 secured to a shaft 43 having a gear 44 (see also Figs. 1, 2, 6 and 7) which engages the gear teeth 17 formed or provided in the slot at the inner periphery of the core 16 as before explained. By this train of mechanism the core 16 is rotated at the desired speed.

The gear 39 previously described, not only constitutes one element of the train of gearing between the motor 35 and core 16, but by reference to Figs. 2 and 5 particularly, it will be seen that it engages gear teeth 45 formed on the outer periphery of one of the spool holders 20, so that this spool holder is driven in the right direction and at a speed properly coördinated with the speed of the core 16. It may be mentioned at this point, that the gear teeth 45 are cut or formed in the central outstanding rib or flange on the spool holder 20 and that the supporting rollers 28 for the spool holder engage the outer periphery of the spool holder on opposite sides of this flange as shown in Fig. 4.

In order that the other spool holder 21 will be driven at the same speed, but in the reverse direction to the spool holder 20, I provide on the shaft 40 a gear 46 which meshes with a gear 47 of the same diameter as the gear 46 and which is mounted on a shaft 48 to which is secured a gear 49 which is of the same size as the gear 39, and which meshes with gear teeth 50 provided on the second spool holder 21, similar to the gear teeth 45. Thus the two winders are rotated in opposite directions and at the same speed.

For the purpose of driving the winders the shafts 40 and 48 which rotate at the same speed, but in opposite directions, are provided respectively with sprocket wheels 51 and 52, which by sprocket chains shown in Fig. 2, drive in opposite directions sprocket wheels 53 and 54 mounted on shafts to which are secured respectively winder driving gears 55 and 56 which engage gear teeth 57 and 58 provided on the peripheries of the two winders. The speed ratios of the coöperating gears can be readily selected so that all the rotating parts are driven at the proper relative speeds.

For the purpose of oscillating the cutters which cut out the inner flat portion 34 of the tube formed on the core 16, the shaft 43 on which the core winding gear 44 is mounted is provided with a gear 60 which engages a pinion 61 secured to a shaft having a crank 62 which is engaged by a block 63 which slides to and fro in a slot 64 in one or both of the cutters or shears 31. This is illustrated clearly in Fig. 7.

I have not endeavored to illustrate in the drawings the supporting bearings for the several driving and gear supporting shafts, to avoid confusion and for the reason that it will be readily understood without description or illustration, that these shafts may be supported in bearings in turn supported from the frame or body of the machine or other supporting means.

Preferably the strip 33 is led or fed to a core 65 on which is formed the body part of the tire. As will be observed from Fig. 9, the core 65 is in cross-section shaped like the hollow closed space of the tire 15 of Fig. 10, this core having, however, at its inner periphery, laterally projecting flanges 65ª on which the edge portions of the strip 33 are molded or bent laterally outward as shown at 65ᵇ to form the beads 15ᵈ of the tire 15. As the U-shaped fabric strip 33 is fed onto the core 65, which may be rotated in any suitable manner, it is compressed by rollers 66 and 67 which press the fabric in a suitable manner onto the outer surface of the core including the flanges 65ª. The construction and number of these rollers or compressors may be varied to suit the requirements. Also these compressors may be driven and may be supported in any suitable manner. They will of necessity be yieldingly supported so that they may give or yield outwardly as the thickness of fabric on the core increases. Obviously any desired number of layers may be applied on the core 65, the number depending upon the size and stiffness or strength required in the tire, it being understood that at each revolution of the core 65 two layers are applied onto the core. If desired, before the innermost layer of the fabric 33 is applied to the core, the core may be coated with sheet rubber, and the latter may also be fed in between the layers of the fabric strip 33. It may be mentioned at this point also, that between the two layers forming the tube on the core 16, rubber may be applied either in sheet or plastic form between the two winders. It is not deemed necessary to illustrate the laying of the rubber as this can be done in numerous ways as is well understood by those skilled in the art.

As the strip 33 is fed to the core 65, the strip 34 which is cut from the inner periphery of the core 16 is led or fed onto the core 68 which has a flat periphery, and this strip is compressed thereon by suitable rollers or compressors 69 so as to form an annulus, flat in cross-section and adapted to form the rim portion 15ᶜ of the tire 15. This annulus may be covered on its inner and outer surface with rubber, and the latter can be applied between the successive layers the same as with the strip 33 when applied to the core 65.

When the proper thicknesses have been applied to the two cores 65 and 68, strips 33 and 34 are cut and the fabric bodies which are formed on these cores are removed. Preferably, however, before the fabric body which is built up on core 65 is removed from the latter, fabric or rubber, or both fabric and rubber which form the tread 15$^e$ is applied and rolled into place. The core 65, and if necessary, the core 68 may be of the collapsible type, of any suitable form which will permit the fabric bodies and the cores to be readily separated.

To form or complete the tire from the two members formed on the cores 65 and 68, the part which forms the body of the tire and the part which forms the rim portion 15$^c$ are placed in a suitable vulcanizing mold with the rim portion 15$^c$ in between the straight sides of the body portions and directly opposite the bead portions 15$^d$, and after a suitable period of vulcanization the tire is completed. In the vulcanizing mold I may use to advantage a tube of rubber which acts as a core in the mold, and which is adapted to be inflated and to be vulcanized directly onto the inner surface of the tire so as to form the inner wall thereof of rubber.

The tire thus formed can be used successfully without the use of a separate inflatable tube now commonly employed, inasmuch as it will not leak, and has sufficient inherent strength, especially when air is admitted in the inner U-shaped space of the tire through a suitable valve not shown to support the load of the vehicle, but should it occur that the air leaks from the tire, the latter will not be rim cut or destroyed in view of the manner in which, and materials from which the tire is formed. The straight sides of the tire, formed as they are of cords give the tire great load and pressure resisting strength. Additionally this tire will have great life, the major portion of the wear occurring on the tread 15$^e$ which when it becomes worn by service can be removed and replaced with a new tread.

Having thus described my invention, what I claim is:

1. The method of forming tires which comprises forming the body of the tire on a core; inserting between the sides at the rim portion of said body an annular rim portion and vulcanizing the parts together.

2. The method of forming tires which comprises forming the body of the tire out of tire forming material, cutting a strip of material from the inner peripheral portion thereof thereby enabling it to be removed from a core, and vulcanizing the strip to the body portion of the tire.

3. The method of making a tire which comprises forming a tube out of tire forming material upon a core, the tube having a flat inner periphery, cutting a strip formed by the flat inner periphery, from the remainder of the tire, whereby the tire may be removed from the core, and vulcanizing the strip to the remaining portion of the tire.

4. The method of making a tire which comprises forming a tube out of tire forming material; cutting a longitudinal strip from the tube; forming the body and rim portions of a tire from the main portion of the tube and the strip cut therefrom respectively; and vulcanizing the two together.

5. The method of making a tire which comprises winding tire forming material into a tube; cutting a longitudinal strip from the tube; feeding the portions of the tube to formers on which the body and rim portions of the tire are formed; inserting the rim portion in the body of the tire; and securing the parts together.

6. The method of forming a tire which comprises forming a tube out of tire forming material; cutting a strip from the tube; forming the body of the tire from the main portion of the tube; forming an annulus from the strip; and securing said annulus to the body of the tire so as to form a closed tire.

7. The method of forming a tire which comprises forming a tube of tire forming material; cutting a strip from the tube longitudinally thereof; forming the body of the tire from the main portion of the tube; forming an annulus from the strip; and vulcanizing the annulus to the sides of the body portion of the tire.

8. The method of forming a tire which comprises forming out of tire forming material a tube having substantially flat sides; cutting from the tube a portion thereof between the flat sides; forming the body of the tire from the main portion of the tube; forming an annulus from the strip; and vulcanizing the annulus to the sides of the body portion of the tire.

9. The method of forming a tire which comprises forming a tube from rubberized cords; cutting a strip from the tube; forming the body of the tire from the main portion of the tube; forming an annulus from the strip; and vulcanizing the annulus to the sides of the body portion of the tire.

10. The method of forming a tire which comprises forming a tube from rubberized cords and with a substantially flat inner portion; cutting from the tube the inner portion thereof; forming the body of the tire from the main portion of the tube; forming an annulus from the strip cut from the inner portion of the tube; and vulcanizing the annulus to the sides of the body portion of the tire.

11. The method of forming a tire which comprises winding cords about a portion of an annular core so as to form a circumferentially curved tube having substantially flat inner periphery and substantially straight parallel sides; cutting from the tube the inner flat periphery; forming the body of the tire from the main portion of the tube; forming an annulus from the strip cut from the inner portion of the tube; and placing the annulus between the sides of the body and vulcanizing the two parts together.

12. The method of forming tires which comprises forming a tubular member on a curved core, removing a section of the tubular member so that the latter can be removed from the core and subsequently securing said section to the tubular member at the place from which it was removed to form a tire.

In testimony whereof, I hereunto affix my signature in the presence of two witnesses.

JOHN T. LISTER.

Copies of this patent may be obtained for five cents each, by addressing the "Commissioner of Patents, Washington, D. C."